United States Patent [19]

Shadeck et al.

[11] Patent Number: 5,409,243
[45] Date of Patent: Apr. 25, 1995

[54] REMOVABLE NOSEPIECES FOR CHUCKS AND SIMILAR TOOL HOLDERS

[75] Inventors: Louis M. Shadeck, Anderson; Robert O. Huff, Piedmont; Valerie Owens, Townville, all of S.C.

[73] Assignee: Jacobs Chuck Technology Corporation, Wilmington, Del.

[21] Appl. No.: 167,429

[22] Filed: Dec. 15, 1993

[51] Int. Cl.6 ............................................. B23B 31/02
[52] U.S. Cl. ...................................... 279/157; 279/60
[58] Field of Search .................................. 279/60–65, 279/157

[56] References Cited

U.S. PATENT DOCUMENTS

| | | | |
|---|---|---|---|
| 4,575,108 | 3/1986 | Whitehead | 279/59 |
| 4,664,394 | 5/1987 | Theissig et al. | 279/1 ME |
| 4,695,066 | 9/1987 | Röhm | 279/62 |
| 5,110,145 | 5/1992 | Stewart | 279/145 |
| 5,135,241 | 8/1992 | Huff et al. | 279/142 |
| 5,299,814 | 4/1994 | Salpaka | 279/157 |

Primary Examiner—Steven C. Bishop
Attorney, Agent, or Firm—Fish & Neave; Robert R. Jackson

[57] ABSTRACT

A removable nosepiece for a chuck or other similar tool holder has an outer ring of relatively hard and inflexible material such as plastic and/or metal and an inner ring of relatively soft and flexible material such as rubber. The outer ring releasably holds the nosepiece on the distal end of the chuck or other tool holder. A tool is inserted into the chuck or tool holder through a central aperture in the inner ring. The inner ring engages the sides of the tool to help keep dust and debris out of the chuck or tool holder. The nosepiece can be removed and replaced when it becomes worn (e.g., when the inner ring is no longer functional).

14 Claims, 3 Drawing Sheets

REMOVABLE NOSEPIECES FOR CHUCKS AND SIMILAR TOOL HOLDERS

BACKGROUND OF THE INVENTION

This invention relates to chucks such as are used for holding drill bits in drills. The invention is also applicable to other chuck-like tool holders such as collets. For convenience herein and in the appended claims all such tool holders will be referred to generically as chucks.

It is known to provide chucks with nose structures which form a seal around a tool held in the chuck to help keep dust and debris from the workpiece out of the chuck. The nose structure may also help to keep the tool centered while the chuck is being tightened on the tool, and it may prevent the tool from dropping out of the chuck when the chuck is loosened. Chucks with nose structures having some or all of these properties are shown in Whitehead U.S. Pat. No. 4,575,108, Theissig et al. U.S. Pat. No. 4,664,394, Rohm U.S. Pat. No. 4,695,066, Huff et al. U.S. Pat. No. 5,135,241, and commonly assigned, co-pending application Ser. No. 08/045,557, now U.S. Pat. No. 5,299,814.

Perhaps the most frequently seen of the above-described structures is a relatively thin rubber membrane over the distal end of the chuck. The membrane has a hole through it coaxial with the central longitudinal axis of the chuck. A tool to be held by the chuck is pushed through this hole. The membrane surrounds the tool and keeps it centered as the chuck is tightened on the tool. During use of the tool the membrane keeps dust and debris from entering the chuck mechanism. And when the tool is no longer needed in the chuck, the membrane keeps the tool from falling out of the loosened chuck until the user deliberately pulls the tool out of the membrane.

A possible shortcoming of the known nose structures of the foregoing type is that the rubber membrane may wear out relatively quickly and thereby cease to perform its intended functions. For example, some tools become quite hot during use, and this heat may cause rapid deterioration of the membrane. The membrane is also at or near the front of the chuck where it may be exposed to contact with workpieces or workpiece debris that can damage it. Thus, in general, the remainder of a chuck typically has a much longer lifespan than the rubber membrane that may be provided on the chuck for such purposes as have been described. Yet in most cases, once the membrane has worn out, there is no convenient way to repair or replace it.

In view of the foregoing, it is an object of this invention to provide improved nose structures for chucks.

It is another object of this invention to provide nosepieces for chucks which are readily removable and replaceable when the rubber membrane of the nosepiece wears out.

SUMMARY OF THE INVENTION

These and other objects of the invention are accomplished in accordance with the principles of the invention by providing a removable chuck nosepiece having an outer ring of a relatively hard and inflexible material such as metal and/or plastic which integrally supports an inner ring of relatively soft and flexible material such as rubber. The outer ring fits snugly on the distal end of a chuck (with the possible addition of latching or detent engagement with the chuck) so that both the inner and outer rings concentrically surround a tool inserted into the chuck through the nosepiece. The inner ring resiliently engages the sides of the tool to provide dust and debris protection for the chuck, as well as tool centering and holding while the tool is not being gripped by the chuck. If the relatively soft inner ring becomes damaged or worn, the nosepiece is easily removed from the chuck and replaced by a similar new nosepiece.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
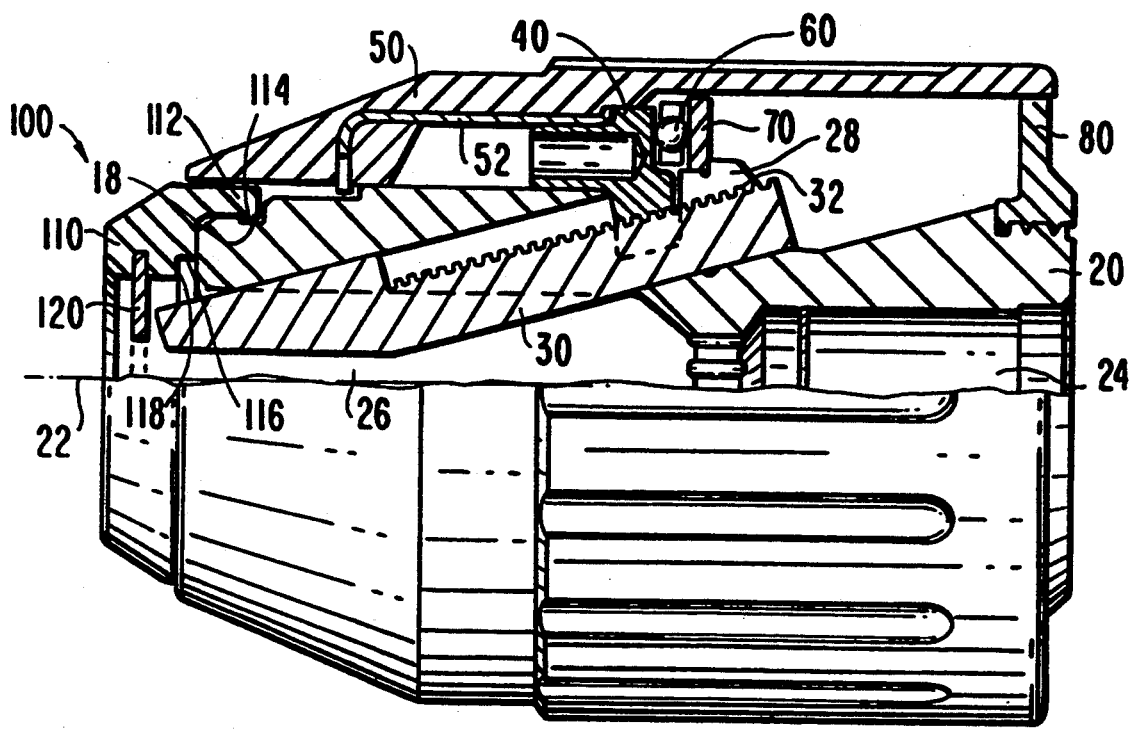
FIG. 1 is an elevational view, partly in section, of an illustrative chuck including a first illustrative embodiment of a removable nosepiece constructed in accordance with the principles of this invention.
Figure 2:
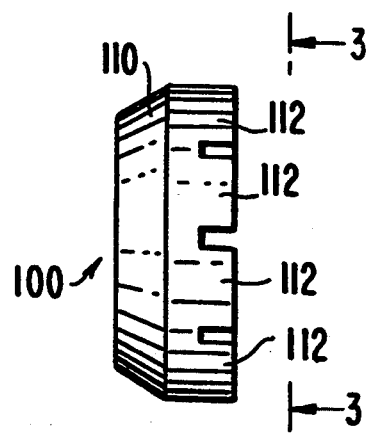
FIG. 2 is an elevational view of just the removable nosepiece shown in FIG. 1.
Figure 3:
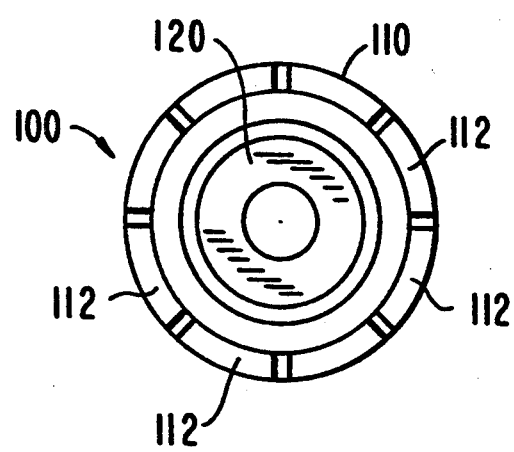
FIG. 3 is an elevational view taken in the direction indicated by the arrows 3—3 in FIG. 2.

As shown in FIG. 1, an illustrative chuck 10 (including illustrative nosepiece 100 constructed in accordance with the principles of this invention) has a main body 20 with a central longitudinal axis 22, a proximal axial bore 24 for receiving the distal end of a shaft (not shown) from machinery that rotates the chuck when the chuck is being used, and a distal axial bore 26 for receiving the proximal shank of a tool (also not shown, but typically a drill bit or other generally similar article). Three jaw members 30 (only one of which is visible in FIG. 1) are respectively disposed in a like number of inclined bores 28 in main body 20. Bores 28 are equally spaced from one another in the circumferential direction around main body 20 and are synclinal in the distal direction. Threads 32 on jaw members 30 engage complementary threads on nut 40. Nut 40 is rotatably mounted on main body 20 concentric with central axis 22. For ease of assembly, nut 40 may be made in two semi-annular halves that are held together by sleeve 50 which is pressed onto the nut.

To facilitate rotation of nut 40, ball bearing assembly 60 may be disposed between the proximal-facing surface of the nut and the distal-facing surface of a bearing race 70 that is pressed onto main body 20.

Sleeve 50 includes an annular metal insert 52 that is molded into the remaining portion of the sleeve. With the exception of insert 52, sleeve 50 is preferably made of a relatively hard and inflexible plastic material such as glass filled polypropylene, nylon, or the like. As mentioned above, sleeve 50 is pressed onto nut 40 so that rotation of sleeve 50 about axis 22 rotates nut 40 about that axis. Rotation of nut 40 moves jaw members 30 in unison in the distal or proximal direction, depending on the direction of rotation of the nut. Jaw members 30 are moved in the distal direction to grip a tool inserted into bore 26. Jaw members 30 are moved in the proximal direction to release a tool.

A toroidal rear disk 80 is mounted on main body 20 to substantially close the rear end of sleeve 50.

Sleeve 50 may be rotated relative to main body 20 by manually holding the sleeve and rotating the main body with the machinery that powers the chuck. Alternatively, main body 20 may be held stationary (e.g., by a spindle lock associated with the chuck-powering machinery), while sleeve 50 is manually rotated.

Illustrative nosepiece 100 of this invention is removably mounted on the distal end of main body 20. Nosepiece 100 includes outer ring 110 and inner ring 120. Both of rings 110 and 120 are substantially concentric with central longitudinal axis 22. Outer ring 110 is made of a relatively hard and inflexible plastic material such as glass filled polypropylene, nylon, or the like. (For convenience, all such materials are referred to generically herein as "plastic".) Thus the material of outer ring 110 may be similar to the material of the non-metallic portion of sleeve 50. Inner ring 120, on the other hand, is made of a relatively soft and flexible rubber or elastomeric material. (For convenience, all such materials are referred to generically herein as "rubber".)

Rings 110 and 120 are preferably bonded together so that they are integral. This may be accomplished, for example, by forming inner ring 120 and then using it as an insert in the mold in which outer ring 110 is molded.

Outer ring 110 preferably snaps onto the distal end of main body 20. In the depicted embodiment this is accomplished by providing outer ring 110 with a plurality of proximally extending fingers or tabs 112 which are spaced circumferentially around ring 110. The radially inner surface of the proximal portion of each finger 112 has a radially inwardly extending detent surface 114. Detent surfaces 114 are received in an annular channel 18 in main body 20 near the distal end of the main body when nosepiece 100 is pushed axially onto the end of the chuck. The material of outer ring 110 is flexible enough to allow fingers 112 to deflect radially outward as detent surfaces 114 pass over the portion of main body 20 which is distal of channel 18. On the other hand, the material of outer ring 110 is stiff enough so that fingers 112 press detent surfaces 114 firmly into channel 18 when the nosepiece is on main body 20, thereby holding the nosepiece securely to the main body.

Inner ring 120 preferably has the shape of a washer, i.e., it is substantially planar with a central aperture that is concentric with axis 22. Tools to be gripped by chuck 10 are inserted into the chuck through the central aperture of inner ring 120. For most such tools the central aperture of inner ring 120 is small enough so that the inner ring engages the sides of the tool. Inner ring 120 therefore performs the functions of (1) centering the tool in the chuck before jaw members 30 are tightened on the tool, (2) preventing dust and debris from entering the chuck around the tool, and (3) preventing the tool from dropping out of the chuck when the chuck is loosened.

Although detent structures 18 and 114 hold nosepiece 100 securely on the chuck as described above, they also allow nosepiece 100 to be removed from the chuck when desired. To facilitate such removal outer ring 110 has a shoulder 116 which bears against a portion of the distal end face of main body 20 so that another portion of that distal end face is spaced from an annular surface 118 of outer ring 110. Shoulder 116 thus provides an annular space between surface 118 and the distal end face of main body 20 into which the end of a tool such as a screw driver can be inserted (through the aperture in inner ring 120) to pry nosepiece 100 off chuck 10 whenever desired. In this way nosepiece 100 can be removed and replaced whenever it becomes unacceptably worn. Inner ring 120 is, of course, the part of nosepiece 100 which is most likely to wear out first.

In addition to the functions and advantages which are described above or which should be readily apparent from the foregoing, the depicted preferred embodiment has the desirable features pointed out below. Inner ring 120 is somewhat recessed within outer ring 110 in the axial direction. This helps to protect inner ring 120 from inadvertent contact with a workpiece during use of chuck 10. This is desirable not only to reduce the risk of damage to inner ring 120, but also to prevent the relatively high-friction inner ring from suddenly and unexpectedly contacting the workpiece and thereby applying suddenly increased torque to the workpiece or reaction torque to chuck 10. The proximal portion of outer ring 110 is axially recessed within the distal end of sleeve 50 so that sleeve 50 covers fingers 112. The outer surfaces of sleeve 50 and ring 110 therefore cooperate to provide a substantially continuous surface.

Figure 4:
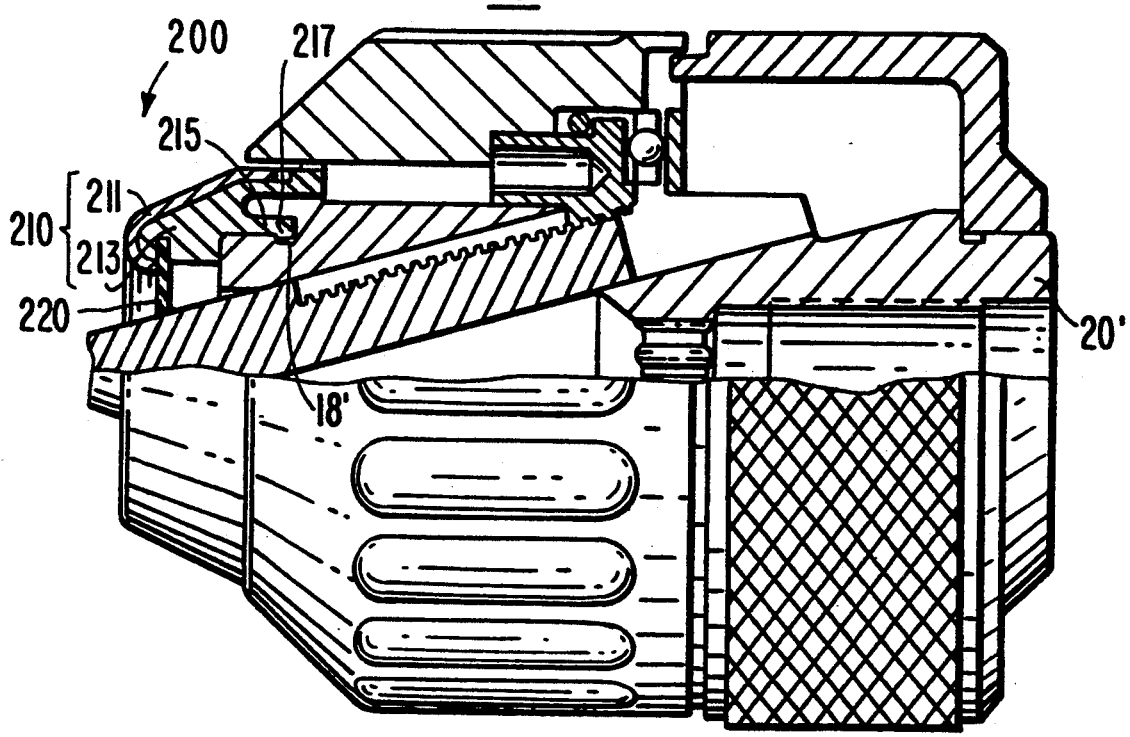
FIG. 4 is a view similar to FIG. 1 showing an alternative embodiment of the invention.
Figure 5:
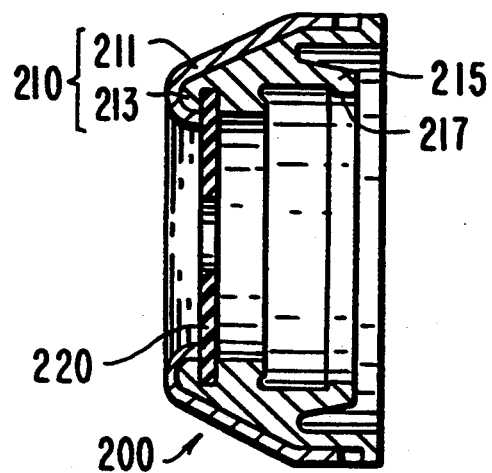
FIG. 5 is a longitudinal sectional view of just the removable nosepiece shown in FIG. 4.

An alternative embodiment of the invention is shown in FIGS. 4 and 5. Although the chuck 10' shown in FIG. 4 is somewhat different from the chuck 10 shown in FIG. 1 and described above, chuck 10' is basically similar to chuck 10 and is substantially conventional. It will therefore not be necessary to further describe chuck 10'. Parts of chuck 10' that are referred to below are identified by the same reference numbers as are used for the corresponding parts in FIG. 1, except that a "prime" symbol is added in FIG. 4.

In the alternative embodiment shown in FIGS. 4 and 5, the outer ring 210 of removable nosepiece 200 is a composite of an outer metal shell 211 and an inner annular body 213 of a plastic material such as may be used for outer ring 10 in nosepiece 100. Inner ring 220 may be similar to inner ring 120 in all respects. Components 211, 213, and 220 are preferably all integral with one another. This may be accomplished, for example, by pre-forming components 211 and 220, and then using them as inserts in the mold in which component 213 is molded.

Nosepiece 200 is removably held on the distal end of chuck 10' by proximally extending portion 215 of component 213 annularly engaging the distal portion of chuck body 20'. In particular, portion 215 may have a radially inwardly projecting annular bead 217 that is releasably received in an annular groove 18' around the distal end of chuck body 20' to releasably latch nosepiece 200 on the chuck.

Nosepiece 200 is functionally similar to nosepiece 100 except that outer metal shell 211 makes nosepiece 200 more resistant to wear. Metal shell 211 may also help nosepiece 200 slide more easily relative to a workpiece that the nosepiece comes into contact with. When inner ring 220 becomes worn, nosepiece 200 may be easily pried off the chuck by a tool such as a screw driver inserted through the aperture in inner ring 220.

Figure 6:
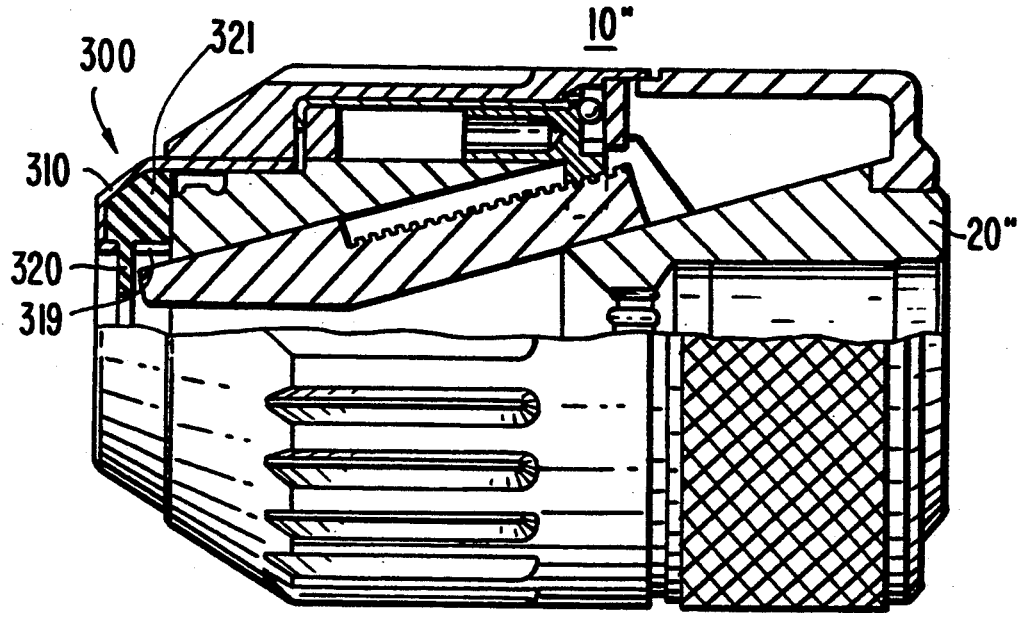
FIG. 6 is another view similar to FIG. 1 showing another alternative embodiment of the invention.
Figure 7:
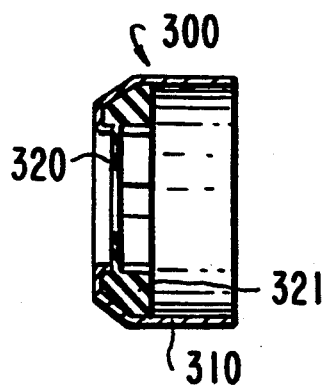
FIG. 7 is a view similar to FIG. 5 for the embodiment of FIG. 6.
Figure 8:
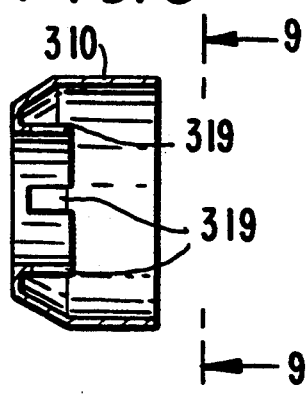
FIG. 8 is a view similar to FIG. 7 showing just one component of the embodiment shown in FIG. 7.
Figure 9:
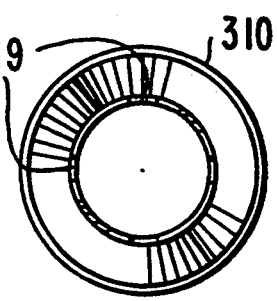
FIG. 9 is a view taken in the direction indicated by the arrows 9—9 in FIG. 8.

Another alternative embodiment of the invention is shown in FIGS. 6–9. Once again the chuck 10" shown in FIG. 6 is generally similar to chucks 10 and 10' and substantially conventional so that it does not require detailed explanation. Chuck parts in FIG. 6 that are similar to parts in FIGS. 1 and 4 are identified by the same reference numbers but with the addition of a "double prime" symbol.

In the embodiment shown in FIGS. 6–9 removable nosepiece 300 has an outer ring 310 of metal such as steel. Outer ring 310 defines an annular channel which holds a ring 321 of rubber. Ring 321 is integral (preferably unitary) with inner rubber ring 320, which may be substantially identical to the inner rubber rings 120 and 220 in the previously described embodiments. Metal ring 310 is formed with a plurality of circumferentially spaced apertures 319 through which inner ring 320 connects to ring 321. Indeed, nosepiece 300 may be made by pre-forming outer metal ring 310 and using it as insert in the mold in which components 320 and 321 are formed simultaneously. Nosepiece 300 is held on the distal end of chuck 10″ by being pressed onto the distal end of chuck body 20″. The fit between outer ring 310 and chuck body 20″ is snug enough to hold nosepiece 300 on the chuck, but is not so tight as to prevent nosepiece 300 from being pried off the chuck in the manner described above for the other embodiments. Nosepiece 300 is thus functionally very similar to nosepieces 100 and 200.

It will be understood that the foregoing is only illustrative of the principles of this invention and that various modifications can be made by those skilled in the art without departing from the scope and spirit of the invention. For example, other types of detent or releasable latching structures can be used to hold the nosepieces 100 of this invention on a chuck.

The invention claimed is:

1. A removable nosepiece for a chuck comprising:
   a first annular ring of relatively hard and inflexible material, said first annular ring being removably mountable on the end of said chuck into which a tool is insertable for holding by said chuck, said first annular ring being substantially concentric with said tool when said first annular ring is mounted on said chuck and said tool is held by said chuck; and
   a second annular ring of relatively soft and flexible material integral with said first annular ring, said second annular ring being substantially concentric with said first annular ring, said second annular ring being spaced from said end of said chuck and the end of said first annular ring which is remote from said end of said chuck when said nosepiece is mounted on said chuck, and said second annular ring having a radially inward annular portion which resiliently engages a tool inserted into said chuck through the center of said second annular ring, said portion being annularly integral.

2. The apparatus defined in claim 1 wherein said first annular ring is made of plastic.

3. The apparatus defined in claim 2 wherein said plastic is selected from the group consisting of glass filled polypropylene and nylon.

4. The apparatus defined in claim 1 wherein said first annular ring is made of metal.

5. The apparatus defined in claim 4 wherein said metal is steel.

6. The apparatus defined in claim 1 wherein said second annular ring is made of rubber.

7. The apparatus defined in claim 1 wherein said first annular ring comprises:
   a core ring made of a material selected from the group consisting of plastic and rubber; and
   a metal sleeve substantially covering at least the portion of said core ring that is exposed when the nosepiece is mounted on said chuck, said second annular ring being integral with said core ring.

8. The apparatus defined in claim 1 wherein said first annular ring comprises detent means for releasably engaging complementary detent means on said chuck for releasably holding said nosepiece on said chuck.

9. The apparatus defined in claim 8 wherein said detent means of said first annular ring comprises a plurality of fingers spaced from one another in the circumferential direction around said first annular ring, each of said fingers extending from the remainder of said first annular ring in the direction in which a tool is inserted through said nosepiece into said chuck, each of said fingers having a detent surface extending radially inwardly toward the center of said first annular ring adjacent the free end of said finger for releasably engaging said complementary detent means on said chuck.

10. The apparatus defined in claim 1 wherein said first annular ring comprises shoulder means for spacing an annular surface of said first annular ring, which faces toward said end of said chuck, from said end of said chuck when said nosepiece is mounted on said chuck in order to provide a clearance between said annular surface and said end of said chuck, into which clearance a prying tool can be inserted to facilitate removal of said nosepiece from said chuck.

11. The apparatus defined in claim 10 wherein said annular surface is disposed on said first annular ring so that, when said nosepiece is mounted on said chuck, said annular surface is only accessible from the interior of said first annular ring.

12. The apparatus defined in claim 11 wherein said annular surface is further disposed on said first annular ring between said second annular ring and said chuck when said nosepiece is mounted on said chuck.

13. The apparatus defined in claim 1 wherein said second annular ring has a washer shape.

14. The apparatus defined in claim 13 wherein the radially outermost portion of said washer shape is anchored in an annular channel in said first annular ring.

* * * * *